(12) United States Patent
Nishidai et al.

(10) Patent No.: US 9,867,008 B2
(45) Date of Patent: Jan. 9, 2018

(54) VEHICLE CONTROL SYSTEM

(71) Applicants: Tetsuo Nishidai, Aichi (JP); Naoyuki Ishihara, Aichi (JP); Yosuke Tomita, Aichi (JP)

(72) Inventors: Tetsuo Nishidai, Aichi (JP); Naoyuki Ishihara, Aichi (JP); Yosuke Tomita, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 15/441,300

(22) Filed: Feb. 24, 2017

(65) Prior Publication Data

US 2017/0251335 A1    Aug. 31, 2017

(30) Foreign Application Priority Data

Feb. 25, 2016   (JP) .................................. 2016-033718

(51) Int. Cl.
| | | |
|---|---|---|
| *H04W 24/00* | (2009.01) | |
| *H04W 4/02* | (2009.01) | |
| *H04W 76/02* | (2009.01) | |
| *H04W 76/06* | (2009.01) | |

(52) U.S. Cl.
CPC ......... *H04W 4/023* (2013.01); *H04W 76/023* (2013.01); *H04W 76/06* (2013.01)

(58) Field of Classification Search
CPC ... H04W 4/023; H04W 76/023; H04W 76/06; B60R 25/04; G07C 5/008; G08G 1/205; A61B 5/002; A61B 5/0205; H04M 3/00; H04M 1/72525; H04M 1/72533;
(Continued)

(56) References Cited

U.S. PATENT DOCUMENTS 4,144,523 A * 3/1979 Kaplit .................. E05B 49/006
                                                                340/5.25
6,060,981 A * 5/2000 Landes .................. B60R 25/04
                                                                180/287
(Continued)

FOREIGN PATENT DOCUMENTS

| JP | 2013-131135 A | | 7/2013 |
| JP | 2013131135 A | * | 7/2013 |
| JP | 2014092001 A | * | 5/2014 |

*Primary Examiner* — Mahendra Patel
(74) *Attorney, Agent, or Firm* — Osha Liang LLP

(57) ABSTRACT

A vehicle control system includes a vehicle control apparatus mounted on a vehicle for controlling the vehicle, an electronic key carried by a user for performing communication with the vehicle control apparatus, and a portable device carried by the user for performing communication with the electronic key. When detecting user's getting in or out of the vehicle, the vehicle control apparatus determines a location of the electronic key based on communication with the electronic key. When the location of the electronic key is in the vehicle and the user has no intention of getting out of the vehicle, communication between the electronic key and the portable device is brought into a connected state. When the location of the electronic key is outside the vehicle and the user has no intention of getting in the vehicle, communication between the electronic key and the portable device is brought into a disconnected state.

9 Claims, 9 Drawing Sheets

(58) Field of Classification Search
CPC ............. H04M 11/007; G08C 2201/42; G08C 2201/93; G08C 17/02
USPC ........ 455/456.1, 418; 340/5.8, 426.12; 701/2
See application file for complete search history.

(56) References Cited

U.S. PATENT DOCUMENTS

| | | | | |
|---|---|---|---|---|
| 8,089,342 | B2* | 1/2012 | Sugiura | B60R 25/24 340/426.13 |
| 8,457,622 | B2* | 6/2013 | Wesby | G06Q 40/00 340/514 |
| 9,112,925 | B2* | 8/2015 | Ikeda | G06Q 30/02 |
| 2006/0022793 | A1* | 2/2006 | Konno | B60R 25/04 340/5.6 |
| 2006/0184456 | A1* | 8/2006 | de Janasz | G06Q 20/12 705/72 |
| 2008/0057929 | A1* | 3/2008 | Min | G08C 17/02 455/418 |
| 2010/0094482 | A1* | 4/2010 | Schofield | G08G 1/205 701/2 |
| 2012/0073892 | A1* | 3/2012 | Hunter | B60K 28/063 180/273 |
| 2014/0114504 | A1* | 4/2014 | Yamashita | B60R 25/40 701/2 |
| 2014/0292581 | A1* | 10/2014 | Orlik | G01S 5/02 342/417 |
| 2015/0005984 | A1* | 1/2015 | De Los Santos | H04L 67/125 701/2 |
| 2015/0061851 | A1* | 3/2015 | Tomita | B60Q 9/008 340/436 |
| 2015/0065893 | A1* | 3/2015 | Ye | A61B 5/6898 600/483 |

* cited by examiner

VEHICLE CONTROL SYSTEM

CROSS-REFERENCE TO RELATED APPLICATION

This application is based on Japanese Patent Application No. 2016-033718 filed with the Japan Patent Office on Feb. 25, 2016, the entire contents of which are incorporated herein by reference.

FIELD

The disclosure relates to a vehicle control system including a control apparatus included in a vehicle; and an electronic key and a portable device which are carried by a user.

BACKGROUND

For a system that locks/unlocks doors of a vehicle using an electronic key, a keyless entry system and a passive entry system are well known. In the keyless entry system, when an electronic key is operated, the electronic key transmits a remote control signal to the vehicle side, and locking/unlocking of doors is performed based on the remote control signal. In the passive entry system, when a user's approach or touch on a door knob is detected, the vehicle side transmits a response request signal, and locking/unlocking of doors is performed based on a response signal which is sent back from an electronic key having received the response request signal.

Meanwhile, various types of in-vehicle apparatuses are mounted on a vehicle. A user can set, for example, a seat position, a door mirror angle, etc., according to his/her preferences. In addition, the user can also freely perform various types of settings of a car navigation apparatus, an audio apparatus, an air conditioning apparatus, etc. However, it is very cumbersome for the user to perform these settings every time he/she gets in the vehicle. For measures to deal with this, there is a method in which setting information of each in-vehicle apparatus is registered as customization information for each electronic key owner, and when a user gets in a vehicle, customization information is read based on his/her electronic key ID, and the setting of each in-vehicle apparatus is automatically performed. However, since the number of electronic keys to be provided to one vehicle is limited, this method has difficulty in dealing with, for example, carsharing where many and unspecified users share a vehicle.

SUMMARY

In view of this, the applicant of the disclosure proposes a system that can handle many users by performing automatic setting of in-vehicle apparatuses by registering customization information in a portable device such as a smartphone owned by a user, downloading the customization information from the portable device to an electronic key when the user gets in a vehicle, and transmitting the customization information from the electronic key to the vehicle side (Japanese Patent Application No. 2016-27033). In this system, it is essential that communication between the electronic key and the portable device be established by performing pairing between the electronic key and the portable device when the user gets in the vehicle. If the user fails to perform the pairing and the communication is not established, then it is impossible to perform automatic setting of in-vehicle apparatuses based on the customization information in the portable device. On the other hand, if the pairing between the electronic key and the portable device is maintained even after the user gets out of the vehicle, then batteries mounted on the electronic key and the portable device are consumed.

Note that JP 2013-131135 A discloses an emergency call system in which application software for emergency call is installed on a portable device such as a smartphone so that when a control apparatus on the vehicle side detects a vehicle accident, an emergency call can be automatically transmitted from the portable device to an emergency call center. In this system, it is essential that communication between the portable device and the control apparatus on the vehicle side be established. If the communication is not established, then it is impossible to transmit an emergency call from the portable device to the emergency call center.

An object of the disclosure is to provide a vehicle control system capable of automatically establishing communication between a portable device and an electronic key or between the portable device and a vehicle when the communication is required, and automatically disconnecting the communication when the communication is not required.

A vehicle control system according to one or more embodiments of the disclosure includes a vehicle control apparatus mounted on a vehicle and configured to control the vehicle; an electronic key carried by a user and configured to perform communication with the vehicle control apparatus; and a portable device carried by the user and configured to perform communication with the electronic key. The vehicle control apparatus determines a location of the electronic key based on communication with the electronic key, when the vehicle control apparatus detects that a predetermined condition is met in the vehicle, the electronic key, or the portable device; and brings communication between the electronic key and the portable device into a connected state or a disconnected state, according to the determined location.

According to such a vehicle control system, the vehicle control apparatus checks a location of the electronic key by communication with the electronic key, and controls the electronic key and the portable device to a connected state or a disconnected state, according to the location. Hence, when the electronic key is present at a location where the electronic key needs to perform communication with the portable device, communication therebetween can be securely established. In addition, when the electronic key is present at a location where the electronic key does not need to perform communication with the portable device, communication therebetween is disconnected, by which battery consumption can be suppressed.

In addition, since the electronic key is interposed between the vehicle control apparatus and the portable device, the electronic key serves as a gateway. Hence, even if, for example, the portable device is connected to the Internet, security performance on the vehicle side can be enhanced compared to a case in which the vehicle control apparatus and the portable device directly communicate with each other.

In one or more embodiments of the disclosure, the vehicle control apparatus may be configured to bring the communication between the electronic key and the portable device into a connected state when the vehicle control apparatus determines that the location of the electronic key is in the vehicle, and to bring the communication between the electronic key and the portable device into a disconnected state when the vehicle control apparatus determines that the location of the electronic key is outside the vehicle.

Alternatively, the vehicle control apparatus may further determine, when the vehicle control apparatus determines that the location of the electronic key is in the vehicle, whether the user has an intention of getting out of the vehicle, based on a fact that a predetermined operation is performed on the electronic key or the vehicle; and bring the communication between the electronic key and the portable device into a connected state when the user has no intention of getting out of the vehicle, and bring the communication between the electronic key and the portable device into a disconnected state when the user has an intention of getting out of the vehicle. In addition, the vehicle control apparatus may further determine, when the vehicle control apparatus determines that the location of the electronic key is outside the vehicle, whether the user has an intention of getting in the vehicle, based on a fact that a predetermined operation is performed on the electronic key or the vehicle; and bring the communication between the electronic key and the portable device into a connected state when the user has an intention of getting in the vehicle, and bring the communication between the electronic key and the portable device into a disconnected state when the user has no intention of getting in the vehicle.

In one or more embodiments of the disclosure, the vehicle control apparatus may be configured to determine whether the vehicle control apparatus succeeds or fails to bring the communication between the electronic key and the portable device into a connected state, based on a notification from the electronic key or the portable device; and output an alert signal when the vehicle control apparatus fails.

In one or more embodiments of the disclosure, the vehicle control apparatus may be configured to bring communication between the portable device and the vehicle control apparatus into a connected state or a disconnected state, instead of bringing the communication between the electronic key and the portable device into a connected state or a disconnected state.

In this case, the vehicle control apparatus may bring the communication between the portable device and the vehicle control apparatus into a connected state when the vehicle control apparatus determines that the location of the electronic key is in the vehicle; and bring the communication between the portable device and the vehicle control apparatus into a disconnected state when the vehicle control apparatus determines that the location of the electronic key is outside the vehicle.

Alternatively, the vehicle control apparatus may further determine, when the vehicle control apparatus determines that the location of the electronic key is in the vehicle, whether the user has an intention of getting out of the vehicle, based on a fact that a predetermined operation is performed on the electronic key or the vehicle; and bring the communication between the portable device and the vehicle control apparatus into a connected state when the user has no intention of getting out of the vehicle, and bring the communication between the portable device and the vehicle control apparatus into a disconnected state when the user has an intention of getting out of the vehicle. In addition, the vehicle control apparatus may further determine, when the vehicle control apparatus determines that the location of the electronic key is outside the vehicle, whether the user has an intention of getting in the vehicle, based on a fact that a predetermined operation is performed on the electronic key or the vehicle; and bring the communication between the portable device and the vehicle control apparatus into a connected state when the user has an intention of getting in the vehicle, and brings the communication between the portable device and the vehicle control apparatus into a disconnected state when the user has no intention of getting in the vehicle.

In addition, the vehicle control apparatus may output an alert signal when the vehicle control apparatus fails to bring the communication between the portable device and the vehicle control apparatus into a connected state.

In one or more embodiments of the disclosure, the predetermined condition for the vehicle may include a first condition regarding user's getting in the vehicle; and a second condition regarding user's getting out of the vehicle. In this case, the first condition may include at least one of following: a door of the vehicle is unlocked, an engine of the vehicle is started, and a shifter of the vehicle is moved from a park position, and the second condition may include at least one of following: the shifter of the vehicle is in the park position, the engine of the vehicle is stopped, and the door of the vehicle is locked. In this case, the vehicle control apparatus determines a location of the electronic key when the vehicle control apparatus detects that either one of the first and second conditions is met.

In one or more embodiments of the disclosure, the predetermined condition for the electronic key may be that a specific operation is performed on the electronic key, and the predetermined condition for the portable device may be that a specific operation is performed on the portable device.

According to the vehicle control system according to one or more embodiments of the disclosure, when communication is required between the portable device and the electronic key or between the portable device and the vehicle, the communication can be automatically established, and when the communication is not required, the communication can be automatically disconnected.

DETAILED DESCRIPTION

Figure 1A:
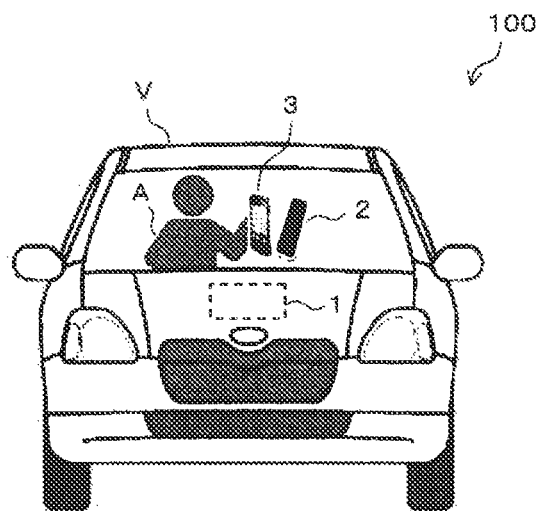
FIGS. 1A and 1B are schematic diagrams of a vehicle control system according to one or more embodiments of the disclosure.

Embodiments of the disclosure will be described with reference to the drawings. In the drawings, the identical or equivalent component is designated by the identical numeral. In embodiments of the disclosure, numerous specific details are set forth in order to provide a more through understanding of the invention. However, it will be apparent to one of ordinary skill in the art that the invention may be practiced without these specific details. In other instances, well-known features have not been described in detail to avoid obscuring the invention.

First Embodiment

A configuration of a vehicle control system of a first embodiment will be described with reference to FIGS. 1A and 1B and 2.

Figure 1B:
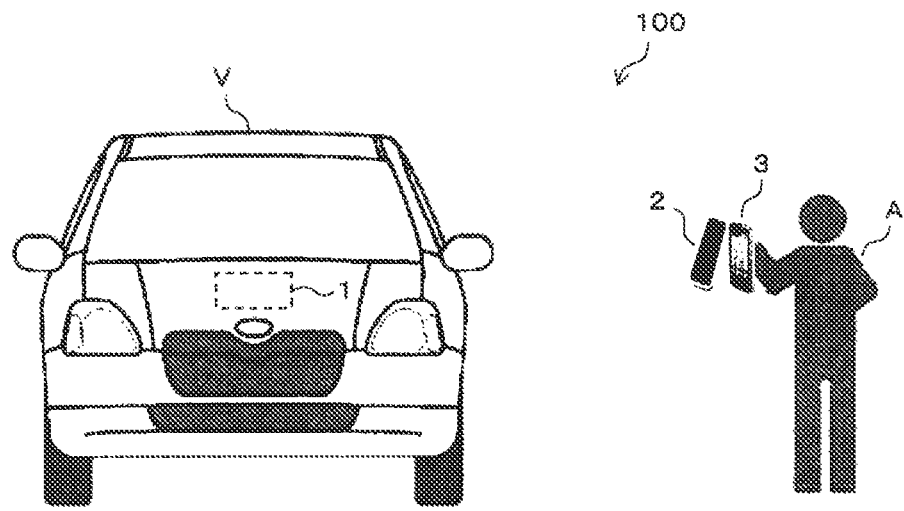

As shown in FIGS. 1A and 1B, a vehicle control system 100 includes a vehicle control apparatus 1 mounted on a vehicle V; an electronic key 2 that performs wireless communication with the vehicle control apparatus 1; and a smartphone 3 that performs wireless communication with the electronic key 2. The electronic key 2 and the smartphone 3 are carried by a user A. The user A performs, for example, the customization setting of in-vehicle apparatuses such as that described previously, using the electronic key 2 and the smartphone 3. Note that although FIGS. 1A and 1B show an example case in which one user A uses one vehicle V, the system can also be applied to a case of, for example, carsharing where a plurality of users share one vehicle V.

Here, the smartphone 3 is an example of a "portable device" in one or more embodiments of the disclosure.

In the vehicle control system 100 of FIGS. 1A and 1B, communication between the electronic key 2 and the smartphone 3 is automatically controlled to a connected state or a disconnected state, according to the location of the electronic key 2, a detail of which will be described later. A summary is as follows. For example, as shown in FIG. 1A, when the user A is in the vehicle V, i.e., when the electronic key 2 is in the vehicle V, communication between the electronic key 2 and the smartphone 3 is controlled to a connected state. On the other hand, as shown in FIG. 1B, when the user A is out of the vehicle V, i.e., when the electronic key 2 is out of the vehicle V, communication between the electronic key 2 and the smartphone 3 is controlled to a disconnected state. In addition, control of connection and disconnection can also be performed based on the location of the electronic key 2 and on whether the user A has an intention of getting in or out of the vehicle V.

Figure 2:
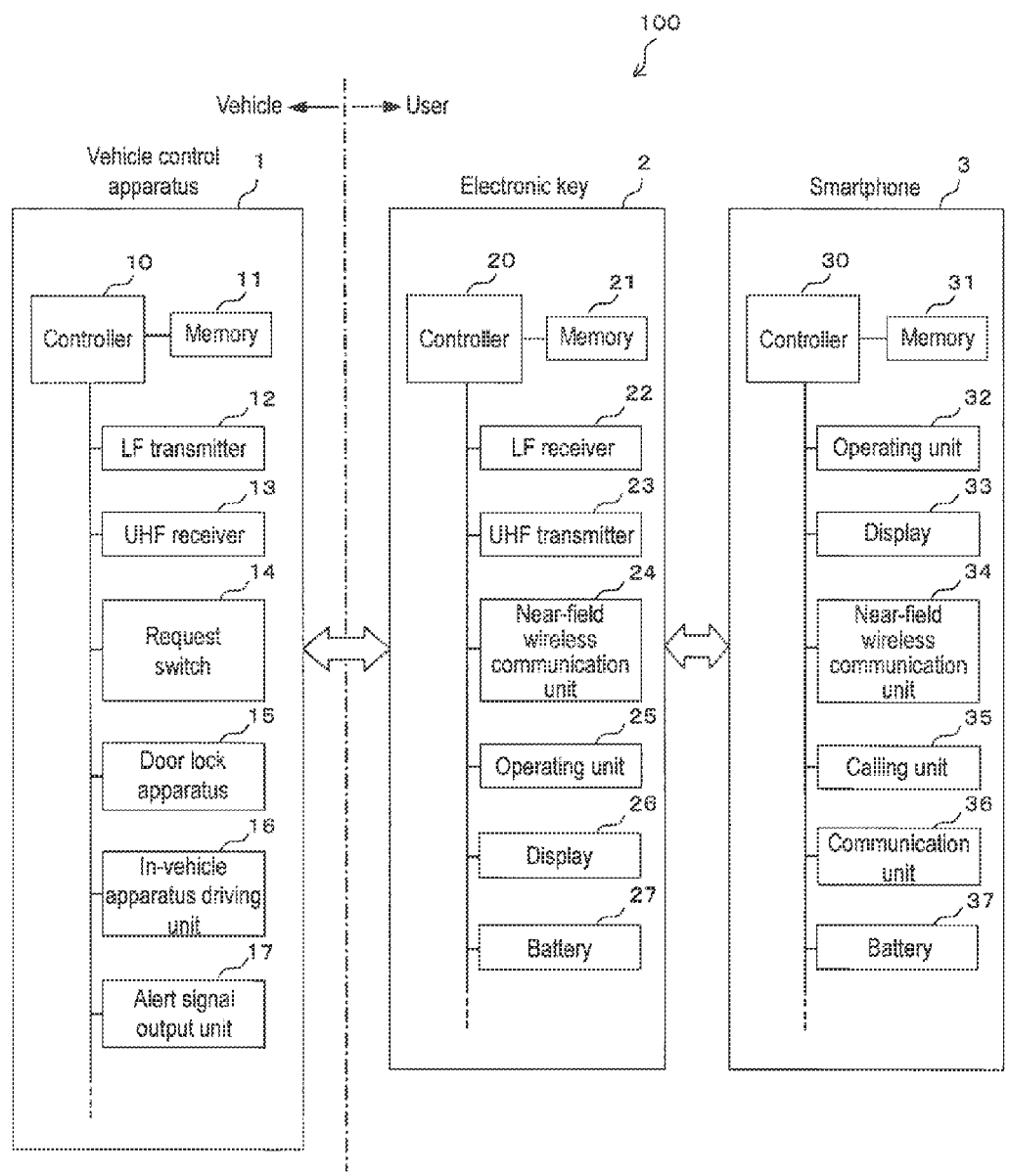
FIG. 2 is a block diagram of a vehicle control system according to a first embodiment.

FIG. 2 shows specific configurations of the vehicle control apparatus 1, the electronic key 2, and the smartphone 3, each of which will be described in detail below.

The vehicle control apparatus 1 includes a controller 10, a memory 11, an LF (Low Frequency) transmitter 12, a UHF (Ultra High Frequency) receiver 13, a request switch 14, a door lock apparatus 15, an in-vehicle apparatus driving unit 16, and an alert signal output unit 17. Although the vehicle control apparatus 1 also includes various other types of blocks, they are not directly related to one or more embodiments of the disclosure and thus are not shown. Note that the vehicle control system 100 of FIG. 2 is not only a keyless entry system that performs locking or unlocking of doors by an operation performed on the electronic key 2, but also a passive entry system that performs locking or unlocking of doors by performing communication between the vehicle control apparatus 1 and the electronic key 2 when the user has approached or touched a door knob.

The controller 10 includes a CPU and controls the operation of the vehicle control apparatus 1. The memory 11 includes memories such as a ROM and a RAM. The LF transmitter 12 intermittently transmits, in a predetermined cycle, an LF signal for checking the location of the electronic key 2. The UHF receiver 13 receives a response signal (described later) which is transmitted from the electronic key 2. The request switch 14 forms a passive entry system, together with the electronic key 2. The request switch 14 is provided near the door knob and detects a user's approach or touch.

The door lock apparatus 15 includes, for example, a lock mechanism that locks and unlocks vehicle doors; and a drive circuit that allows the lock mechanism to operate. The in-vehicle apparatus driving unit 16 includes, for example, a drive circuit for driving in-vehicle apparatuses (not shown) such as seats, door mirrors, a car navigation apparatus, an audio apparatus, an air conditioning apparatus, and illuminating lamps; and a control circuit. The alert signal output unit 17 outputs an alert signal when a communication abnormality (described later) occurs between the electronic key 2 and the smartphone 3.

The electronic key 2 includes a controller 20, a memory 21, an LF receiver 22, a UHF transmitter 23, a near-field wireless communication unit 24, an operating unit 25, a display 26, and a battery 27. Although the electronic key 2 also includes other blocks, they are not directly related to one or more embodiments of the disclosure and thus are not shown.

The controller 20 includes a CPU and controls the operation of the electronic key 2. The memory 21 includes memories such as a ROM and a RAM. The LF receiver 22 receives the aforementioned LF signal transmitted from the LF transmitter 12 of the vehicle control apparatus 1. The UHF transmitter 23 transmits a response signal (described later) to the vehicle control apparatus 1 by UHF communication. The near-field wireless communication unit 24 includes a communication circuit for near-field wireless communication such as a wireless LAN or Bluetooth (registered trademark). The operating unit 25 includes a plurality of operating buttons provided to a main body of the electronic key 2. The display 26 includes a plurality of LED lamps provided to the main body of the electronic key 2. The battery 27 includes a lithium battery (primary battery), etc., and supplies power to each unit of the electronic key 2.

The smartphone 3 includes a controller 30, a memory 31, an operating unit 32, a display 33, a near-field wireless communication unit 34, a calling unit 35, a communication unit 36, and a battery 37. Although the smartphone 3 also includes various other types of blocks, they are not directly related to one or more embodiments of the disclosure and thus are not shown.

The controller 30 includes a CPU and controls the operation of the smartphone 3. The memory 31 includes memories such as a ROM and a RAM. The operating unit 32 includes operating buttons provided to a main body of the smartphone 3 and operating buttons displayed on the display 33. The display 33 includes, for example, a liquid crystal panel provided to the main body of the smartphone 3; and a drive circuit for the liquid crystal panel. The near-field wireless communication unit 34 includes the same communication circuit as that of the near-field wireless communication unit 24 of the electronic key 2. The calling unit 35 includes a speaker, a microphone, an audio circuit, and the like. The communication unit 36 includes a communication circuit that is connected to an Internet line to perform communication with a server, etc. The battery 37 includes a rechargeable lithium battery (secondary battery), etc., and supplies power to each unit of the smartphone 3.

Next, procedural steps for controlling communication between the electronic key 2 and the smartphone 3 in the vehicle control system 100 configured in the above-described manner will be described with reference to a flowchart of FIG. 3. In the following, it is premised that the user carries both the electronic key 2 and the smartphone 3 when he/she gets in or out of the vehicle V.

The vehicle control apparatus 1 monitors whether a get-in condition regarding user's getting in the vehicle V or a get-out condition regarding user's getting out of the vehicle V has been met (step S101). The get-in condition is a condition that is met when user's getting in the vehicle V is expected or when the user has actually got in the vehicle V. The get-in condition includes at least one of the following: a vehicle door is unlocked, a vehicle engine is started, and a vehicle shifter is moved from a park position. The get-out condition is a condition that is met when user's getting out of the vehicle V is expected or when the user has actually got out of the vehicle V. The get-out condition includes at least one of the following: the vehicle shifter is in the park position, the vehicle engine is stopped, and the vehicle door is locked.

Here, the get-in condition is an example of a "first condition" in one or more embodiments of the disclosure, and the get-out condition is an example of a "second condition" in one or more embodiments of the disclosure.

If the get-in condition or the get-out condition is met (step S101; YES), the LF transmitter 12 of the vehicle control apparatus 1 starts the operation of intermittently transmitting, in a predetermined cycle, an LF signal for checking the location of the electronic key 2 (step S102). The LF signal is intermittently received by the LF receiver 22 of the electronic key 2 in the predetermined cycle (step S201).

When the electronic key 2 receives, by the LF receiver 22, the LF signal, the electronic key 2 measures, by the controller 20, the strength of the LF signal and transmits, from the UHF transmitter 23, the measured value together with a response signal (step S202). That is, the response signal includes signal strength information. The response signal is received by the UHF receiver 13 of the vehicle control apparatus 1 (step S103).

When the vehicle control apparatus 1 receives, by the UHF receiver 13, the response signal, the vehicle control apparatus 1 computes, by the controller 10, a distance from the vehicle V to the electronic key 2 based on the signal strength information included in the response signal, and determines the location of the electronic key 2 from the computation result (step S104). The signal strength decreases as the electronic key 2 moves away from the vehicle V, and increases as the electronic key 2 approaches the vehicle V. Thus, a determination as to whether the electronic key 2 is in or outside the vehicle V can be made by comparing the value of the signal strength with a predetermined threshold.

Then, the vehicle control apparatus 1 transmits a pairing control command to the electronic key 2, according to the location of the electronic key 2 (step S105). The pairing control command is a command for bringing communication between the electronic key 2 and the smartphone 3 into a connected state or a disconnected state. Specifically, when it is determined that the electronic key 2 is in the vehicle V, the LF transmitter 12 transmits to the electronic key 2 a pairing control command for bringing communication between the electronic key 2 and the smartphone 3 into a connected state. On the other hand, when it is determined that the electronic key 2 is outside the vehicle V, the LF transmitter 12 transmits to the electronic key 2 a pairing control command for bringing communication between the electronic key 2 and the smartphone 3 into a disconnected state. The transmitted pairing control command is received by the LF receiver 22 of the electronic key 2 (step S203).

When the LF receiver 22 receives the pairing control command, the controller 20 of the electronic key 2 performs or cancels pairing between the electronic key 2 and the smartphone 3, according to the command (steps S204 and S301).

Specifically, when the pairing control command is a command that instructs to establish a connection (hereinafter, referred to as "connection command"), i.e., when the electronic key 2 is in the vehicle V, communication is performed between the near-field wireless communication unit 24 of the electronic key 2 and the near-field wireless communication unit 34 of the smartphone 3 to perform pairing, by which the electronic key 2 and the smartphone 3 are brought into a connected state. On the other hand, when the pairing control command is a command that instructs to disconnect communication (hereinafter, referred to as "disconnection command"), i.e., when the electronic key 2 is outside the vehicle V, communication between the near-field wireless communication units 24 and 34 is stopped to cancel pairing, by which the electronic key 2 and the smartphone 3 are brought into a disconnected state. In this manner, communication between the electronic key 2 and the smartphone 3 is controlled to a connected state or a disconnected state, according to the location of the electronic key 2.

Figure 4:
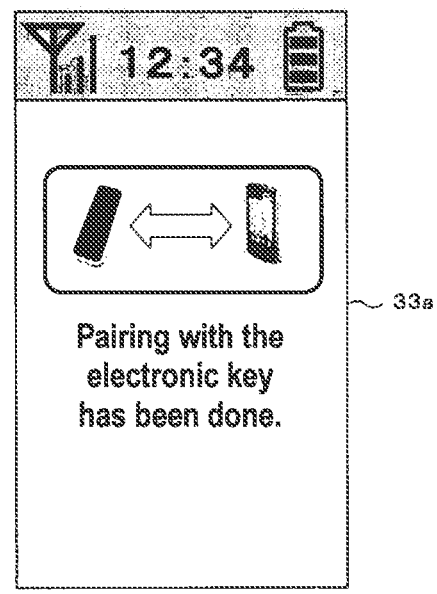
FIG. 4 is a diagram showing a pairing completion notification screen according to the first embodiment.
Figure 5:
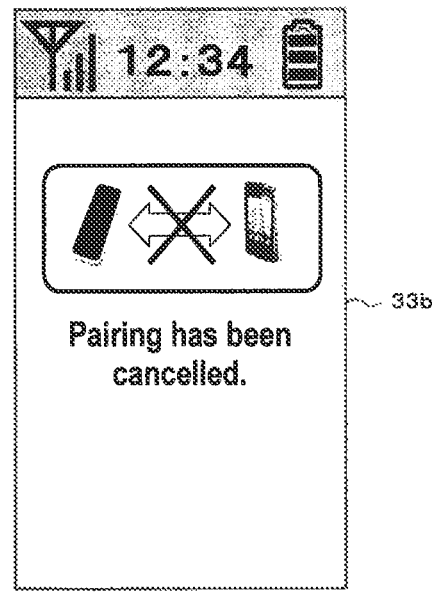
FIG. 5 is a diagram showing a pairing cancellation notification screen according to the first embodiment.

On the smartphone 3, when, at step S301, communication with the electronic key 2 is established by performing pairing, a pairing completion notification screen 33a such as that shown in FIG. 4 is displayed on a screen of the display 33 (step S302). Alternatively, when communication with the electronic key 2 is disconnected by canceling pairing, a pairing cancellation notification screen 33b such as that shown in FIG. 5 is displayed on a screen of the display 33 (step S302).

After the electronic key 2 performs or cancels pairing at step S204, the electronic key 2 transmits, as a UHF signal, a pairing control result from the UHF transmitter 23 to the vehicle control apparatus 1 (step S205). When a connection by performing of pairing has succeeded or when a disconnection by cancellation of pairing has succeeded, the notifications "connection is OK" and "disconnection is OK" are transmitted, respectively. When they have failed, the notifications "connection is NG" and "disconnection is NG" are transmitted, respectively.

When the vehicle control apparatus 1 receives, by the UHF receiver 13, the UHF signal, i.e., the pairing control result, which is transmitted from the electronic key 2 (step S106), the vehicle control apparatus 1 determines whether pairing has succeeded or failed, by referring to the pairing control result, and further determines whether an alert needs to be outputted (step S107). For example, when it is determined at step 104 that the electronic key 2 is in the vehicle V and the pairing control result received at step S106 is "connection is OK", the vehicle control apparatus 1 determines that an alert does not need to be outputted (step S107; NO), and thus an alert signal is not outputted. However, when, despite the fact that it is determined at step S104 that the electronic key 2 is in the vehicle V, the pairing control result received at step S106 is "connection is NG", since the electronic key 2 and the smartphone 3 are not paired, the vehicle control apparatus 1 determines that an alert needs to be outputted (step S107; YES), and thus outputs an alert signal from the alert signal output unit 17 (step S108). Based on the alert signal, for example, a warning message or the like is displayed on a screen of a car navigation apparatus (not shown).

After establishing communication between the near-field wireless communication units 24 and 34 of the electronic key 2 and the smartphone 3 by performing paring between the electronic key 2 and the smartphone 3, it becomes possible to perform the aforementioned customization setting of in-vehicle apparatuses, etc., using the electronic key 2 and the smartphone 3.

According to the above-described first embodiment, the vehicle control apparatus 1 checks a location of the electronic key 2 by LF communication with the electronic key 2, and transmits to the electronic key 2 a pairing control command (a connection command or a disconnection command) determined according to the location. Then, based on the command, communication between the electronic key 2 and the smartphone 3 goes into a connected state or a disconnected state. Hence, when the electronic key 2 is in the vehicle V and thus requires communication with the smartphone 3, communication therebetween can be securely established. On the other hand, when the electronic key 2 is outside the vehicle V and thus does not require communication with the smartphone 3, since communication therebetween is automatically disconnected, the consumption of the batteries 27 and 37 of the electronic key 2 and the smartphone 3 can be suppressed.

In addition, since the electronic key 2 is interposed between the vehicle control apparatus 1 and the smartphone 3, the electronic key 2 serves as a gateway. Hence, even if, for example, the smartphone 3 is connected to the Internet, security performance on the vehicle side can be enhanced compared to a case in which the vehicle control apparatus 1 and the smartphone 3 directly communicate with each other.

Although, in the above-described example, the vehicle control apparatus 1 controls communication between the electronic key 2 and the smartphone 3 to a connected state or a disconnected state based only on the location of the electronic key 2, the vehicle control apparatus 1 may control the communication therebetween based on the location of the electronic key 2 and a user's intention to get in or out of the vehicle V. Procedural steps for this case are as follows.

When the vehicle control apparatus 1 determines that the location of the electronic key 2 is in the vehicle V, the vehicle control apparatus 1 further determines whether the user has an intention of getting out of the vehicle V, based on a fact that a predetermined operation is performed on the electronic key 2 or the vehicle V. For example, when the engine has started, or the shifter has been shifted to a position other than park, or the doors are locked with the user being in the vehicle V (with the electronic key 2 being in the vehicle V), it is determined that the user has no intention of getting out of the vehicle V. In this case, the vehicle control apparatus 1 transmits to the electronic key 2 a connection command for bringing communication between the electronic key 2 and the smartphone 3 into a connected state (step S105). On the other hand, when the engine has stopped, or the shifter has been shifted to the park position, or the doors are unlocked with the user being in the vehicle V, it is determined that the user has an intention of getting out of the vehicle V. In this case, the vehicle control apparatus 1 transmits to the electronic key 2 a disconnection command for bringing communication between the electronic key 2 and the smartphone 3 into a disconnected state (step S105).

In addition, when the vehicle control apparatus 1 determines that the location of the electronic key 2 is outside the vehicle V, the vehicle control apparatus 1 further determines whether the user has an intention of getting in the vehicle V, based on a fact that a predetermined operation is performed on the electronic key 2 or the vehicle V. For example, when the doors are unlocked with the user being outside the vehicle V (with the electronic key 2 being outside the vehicle V), it is determined that the user has an intention of getting in the vehicle V. In this case, the vehicle control apparatus 1 transmits to the electronic key 2 a connection command for bringing communication between the electronic key 2 and the smartphone 3 into a connected state (step S105). On the other hand, when the doors are locked with the user being outside the vehicle V, it is determined that the user has no intention of getting in the vehicle V. In this case, the vehicle control apparatus 1 transmits to the electronic key 2 a disconnection command for bringing communication between the electronic key 2 and the smartphone 3 into a disconnected state (step S105).

In this manner, communication between the electronic key 2 and the smartphone 3 is controlled to a connected state or a disconnected state, according to the location of the electronic key 2 and a user's intention to get in or out of the vehicle V.

Figure 6:
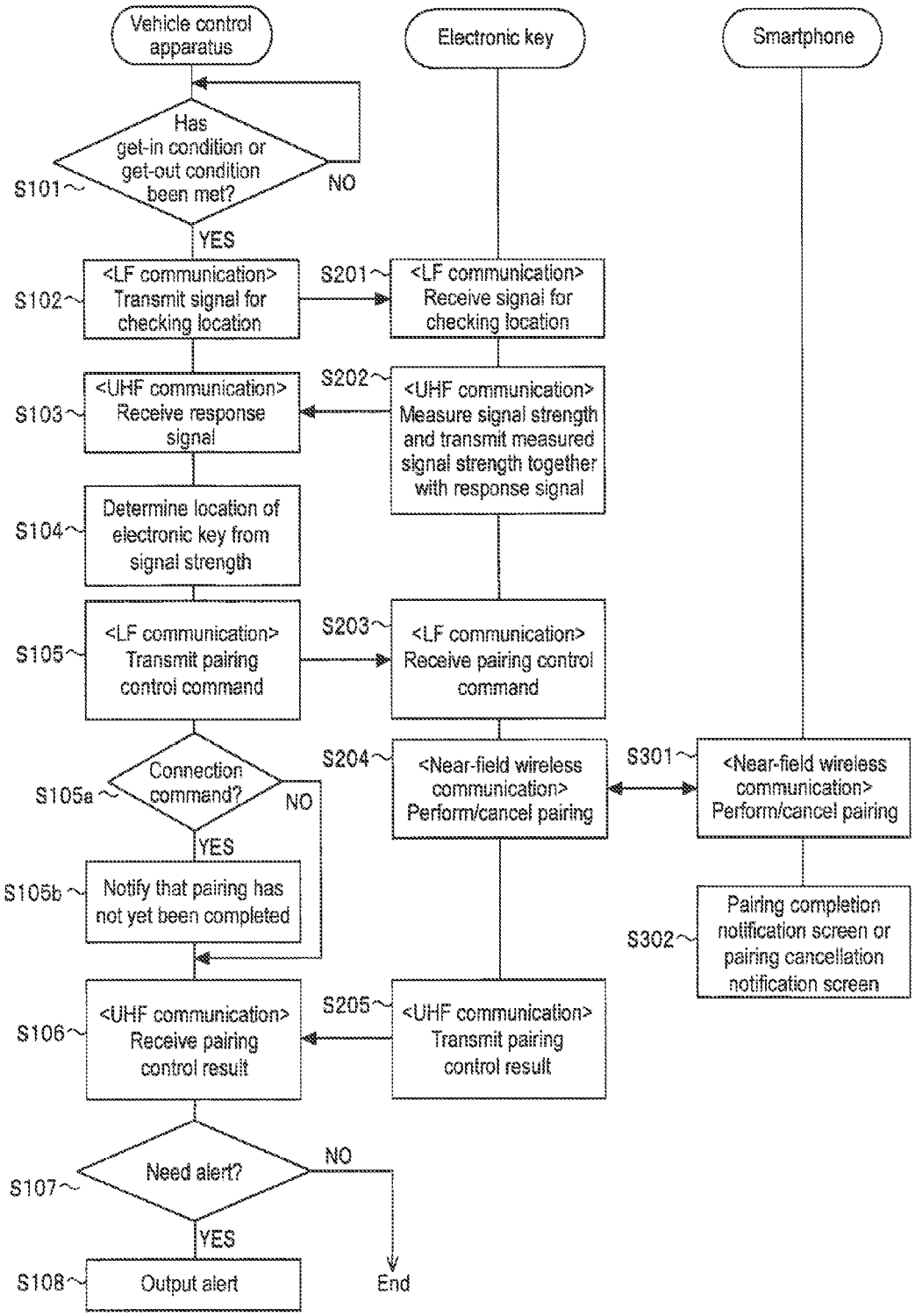
FIG. 6 is a flowchart for another example according to the first embodiment.

FIG. 6 shows a flowchart for a variant of the first embodiment. In FIG. 6, those steps that perform the same processes as in FIG. 3 are denoted by the same reference signs. In FIG. 6, steps S105a and S105b are added between steps S105 and S106. At step S105a, it is determined whether a pairing control command transmitted at step S105 is a connection command. If the pairing control command is a connection command (step S105a; YES), at step S105b a fact that pairing has not yet been completed (communication is in a non-connected state) is informed during a period before communication between the electronic key 2 and the smartphone 3 goes into a connected state, i.e., during a period before a result of "connection is OK" is received at step S106. This informing may be performed by, for example, a message displayed on a screen of a car navigation apparatus, lighting of a lamp, or audio output. Other steps of FIG. 6 are the same as those of FIG. 3 and thus an overlapping description is omitted.

Second Embodiment

Next, a second embodiment of the disclosure will be described. An overall configuration of a vehicle control system of the second embodiment is basically the same as that of the first embodiment shown in FIGS. 1A and 1B. Note, however, that the second embodiment differs from the first embodiment in that while pairing is performed between the electronic key 2 and the smartphone 3 in the first embodiment, pairing is performed between the vehicle control apparatus 1 and the smartphone 3 in the second embodiment.

Figure 7:
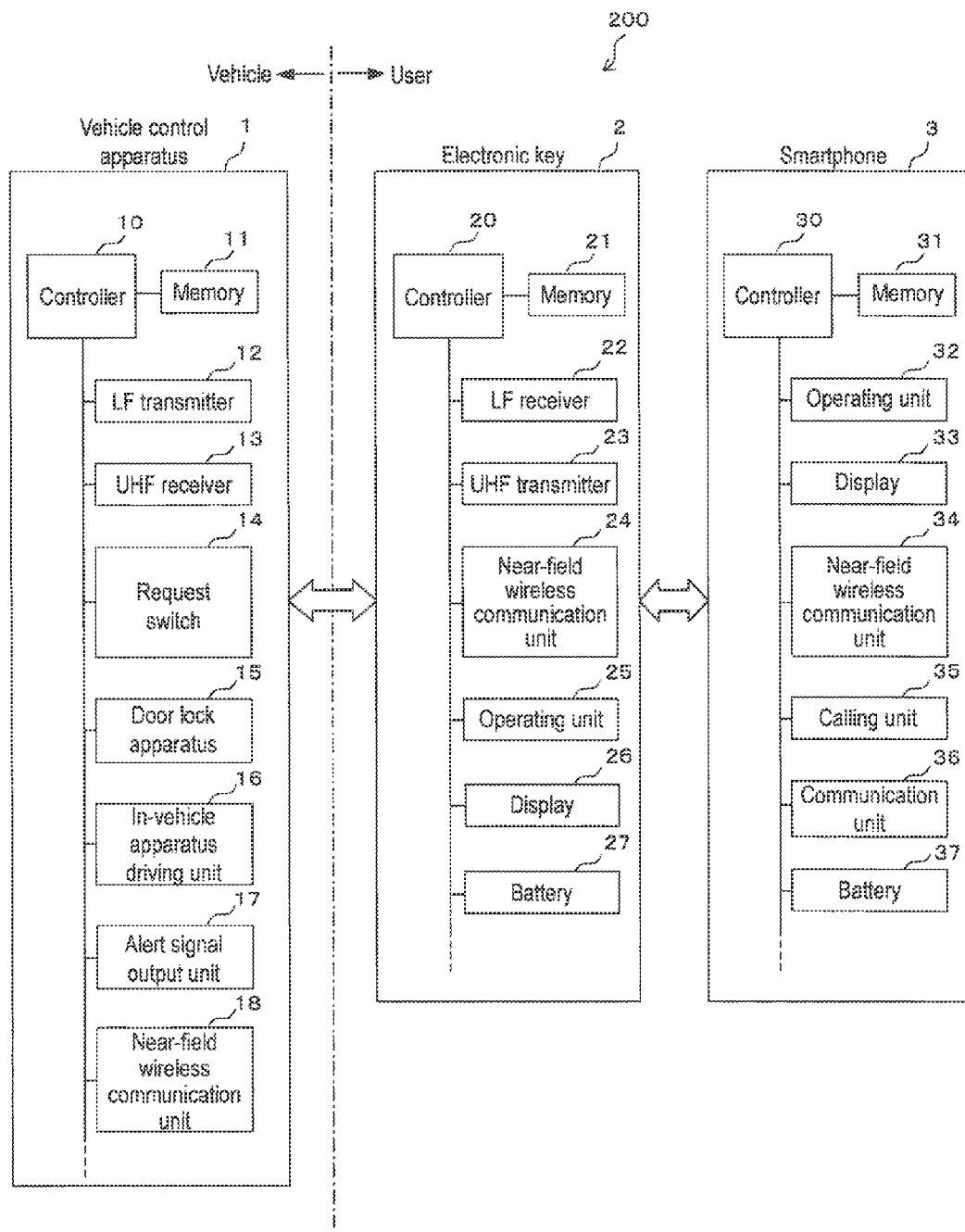
FIG. 7 is a block diagram of a vehicle control system according to a 20 second embodiment.

FIG. 7 shows a configuration of a vehicle control system 200 of the second embodiment. FIG. 7 differs from FIG. 2 in that a near-field wireless communication unit 18 is added to the vehicle control apparatus 1. Other configurations do not differ from those in FIG. 2 and thus an overlapping description is omitted.

Figure 8:
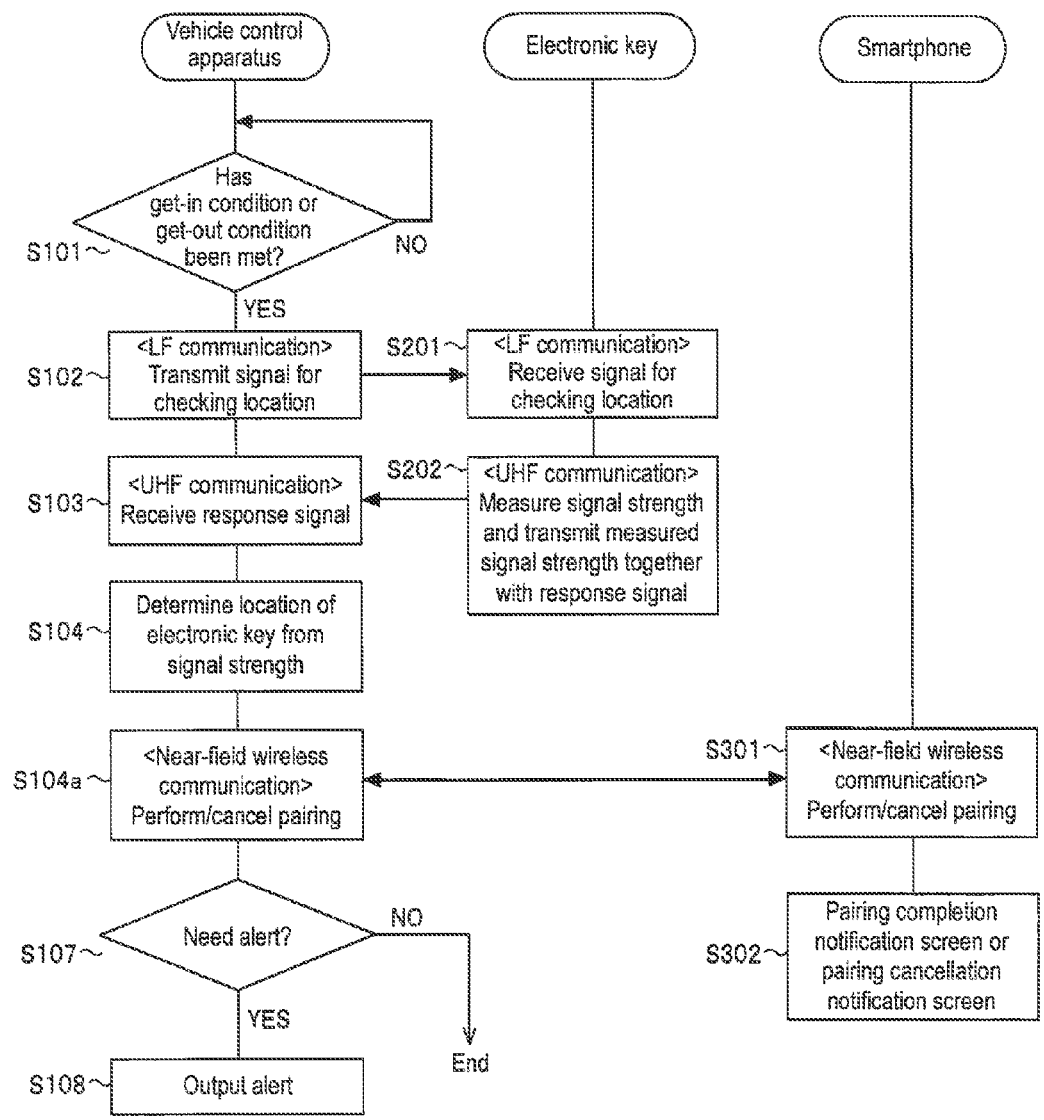
FIG. 8 is a flowchart of the vehicle control system according to the second embodiment.

FIG. 8 shows procedural steps for communication control of the second embodiment. In FIG. 8, those steps that perform the same processes as in FIG. 3 are denoted by the same reference signs. In the second embodiment, since the vehicle control apparatus 1 performs pairing by directly communicating with the smartphone 3, a pairing control command does not need to be transmitted from the vehicle control apparatus 1 to the electronic key 2. In addition, since the vehicle control apparatus 1 can determine itself whether pairing has succeeded or failed, the vehicle control apparatus 1 does not even need to receive a notification as to whether pairing is succeeded or failed, from the electronic key 2 or the smartphone 3. Due to this, in FIG. 8, step S104a is added after step S104, and S105, S106, and S203 to S205 of FIG. 3 are omitted.

Figure 9:
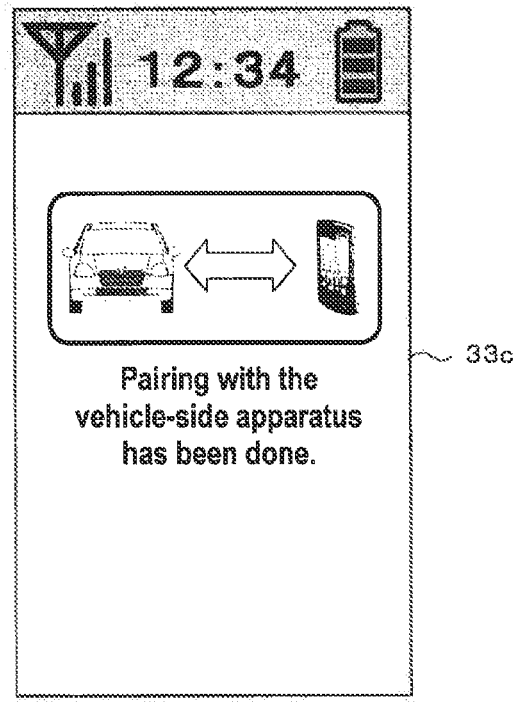
FIG. 9 is a diagram showing a pairing completion notification screen according to the second embodiment.
Figure 10:
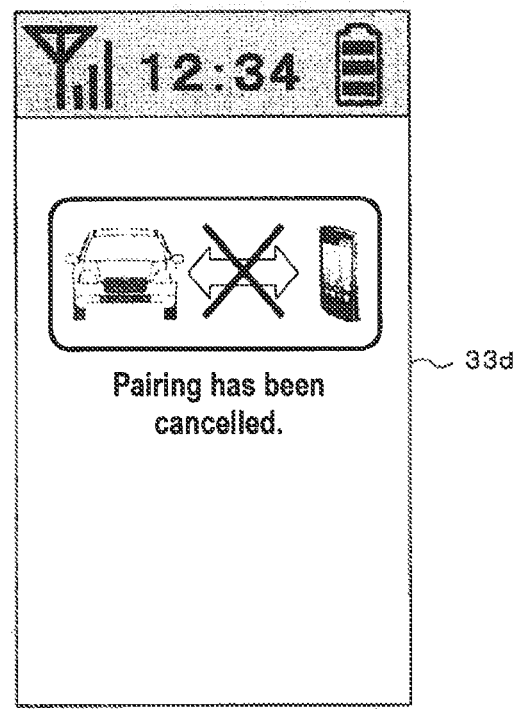
FIG. 10 is a diagram showing a pairing cancellation notification screen according to the second embodiment.

As described above, in the second embodiment, since pairing is performed between the vehicle control apparatus 1 and the smartphone 3, the vehicle control apparatus 1 determines a location of the electronic key 2 at step S104 of FIG. 8, and then performs, by the near-field wireless communication unit 18, communication with the near-field wireless communication unit 34 of the smartphone 3. Then, when the electronic key 2 is in the vehicle V, pairing between the vehicle control apparatus 1 and the smartphone 3 is performed, and when the electronic key 2 is outside the vehicle V, pairing between the vehicle control apparatus 1 and the smartphone 3 is cancelled (steps S104a and S301). On the smartphone 3, when pairing is performed, a pairing completion notification screen 33c such as that shown in FIG. 9 is displayed on the display 33, and when pairing is cancelled, a pairing cancellation notification screen 33d such as that shown in FIG. 10 is displayed on the display 33 (step S302). Other steps are the same as those of FIG. 3 and thus an overlapping description is omitted.

According to the above-described second embodiment, the vehicle control apparatus 1 checks a location of the electronic key 2 by LF communication with the electronic key 2, and controls communication between the vehicle control apparatus 1 and the smartphone 3 to a connected state or a disconnected state, according to the location. Hence, when the user is in the vehicle V and communication is required between the vehicle control apparatus 1 and the smartphone 3, the communication therebetween can be securely established. On the other hand, when the user is outside the vehicle V and communication is not required between the vehicle control apparatus 1 and the smartphone 3, since the communication therebetween is automatically disconnected, consumption of the battery 37 of the smartphone 3 can be suppressed.

Note that in the second embodiment, too, communication between the vehicle control apparatus 1 and the smartphone 3 may be controlled based on the location of the electronic key 2 and a user's intention to get in or out of the vehicle V. Procedural steps for this case are as follows.

When the vehicle control apparatus 1 determines that the location of the electronic key 2 is in the vehicle V, the vehicle control apparatus 1 further determines whether the user has an intention of getting out of the vehicle V, based on a fact that a predetermined operation is performed on the electronic key 2 or the vehicle V. For example, when the engine has started, or the shifter has been shifted to a position other than park, or the doors are locked with the user being in the vehicle V (with the electronic key 2 being in the vehicle V), it is determined that the user has no intention of getting out of the vehicle V. In this case, the vehicle control apparatus 1 brings communication between the smartphone 3 and the vehicle control apparatus 1 into a connected state (steps S104a and S301). On the other hand, when the engine has stopped, or the shifter has been shifted to the park position, or the doors are unlocked with the user being in the vehicle V, it is determined that the user has an intention of getting out of the vehicle V. In this case, the vehicle control apparatus 1 brings communication between the smartphone 3 and the vehicle control apparatus 1 into a disconnected state (steps S104a and S301).

In addition, when the vehicle control apparatus 1 determines that the location of the electronic key 2 is outside the vehicle V, the vehicle control apparatus 1 further determines whether the user has an intention of getting in the vehicle V, based on a fact that a predetermined operation is performed on the electronic key 2 or the vehicle V. For example, when the doors are unlocked with the user being outside the vehicle V (with the electronic key 2 being outside the vehicle V), it is determined that the user has an intention of getting in the vehicle V. In this case, the vehicle control apparatus 1 brings communication between the smartphone 3 and the vehicle control apparatus 1 into a connected state (steps S104a and S301). On the other hand, when the doors are locked with the user being outside the vehicle V, it is determined that the user has no intention of getting in the vehicle V. In this case, the vehicle control apparatus 1 brings communication between the smartphone 3 and the vehicle control apparatus 1 into a disconnected state (steps S104a and S301).

The disclosure can also adopt various embodiments such as those shown below, in addition to the above-described embodiments.

Figure 11A:
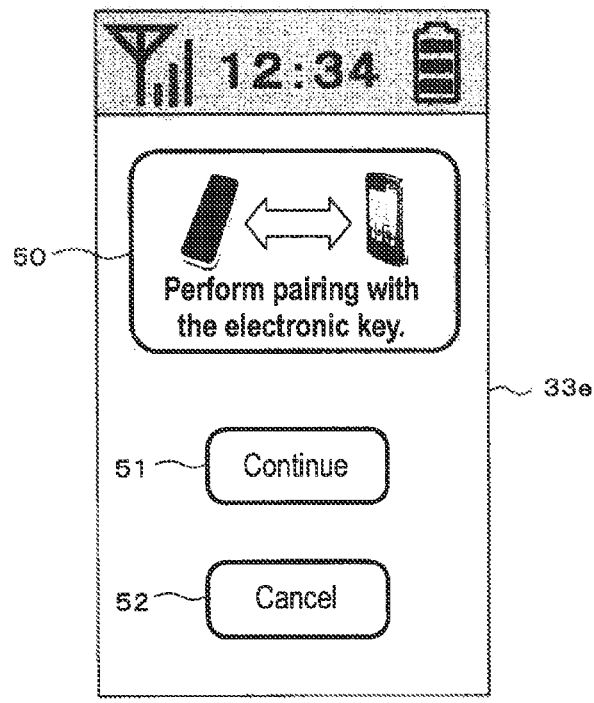
FIGS. 11A and 11B are diagrams showing pairing start guidance screens of a portable device.
Figure 11B:
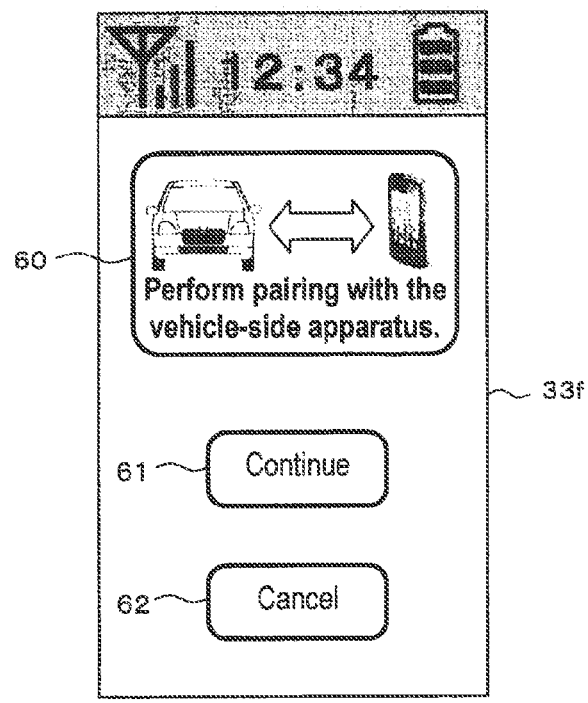

In the first embodiment, prior to performing pairing between the electronic key 2 and the smartphone 3, a pairing start guidance screen 33e shown in FIG. 11A may be displayed on the display 33 of the smartphone 3. In addition, in the second embodiment, prior to performing pairing between the vehicle control apparatus 1 and the smartphone 3, a pairing start guidance screen 33f shown in FIG. 11B may be displayed on the display 33 of the smartphone 3. These screens display messages 50 and 60 notifying about performing of pairing, continue buttons 51 and 61, and cancel buttons 52 and 62. Pairing starts when the continue buttons 51 and 61 are pressed, and is cancelled when the cancel buttons 52 and 62 are pressed.

Figure 3:
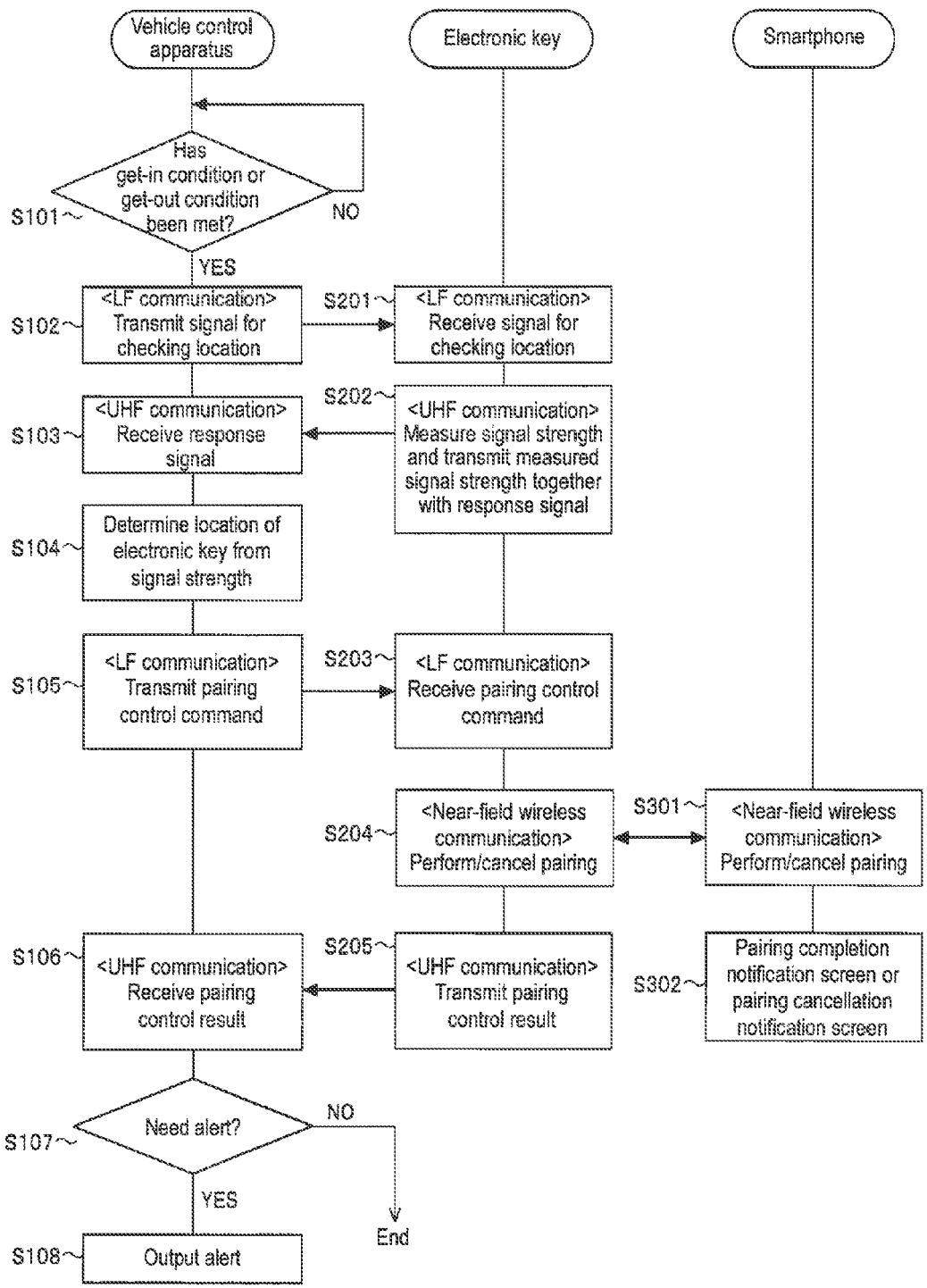
FIG. 3 is a flowchart of the vehicle control system according to the first embodiment.

Although in the above-described embodiments, a pairing control result is transmitted from the electronic key 2 to the vehicle control apparatus 1 at step S205 of FIGS. 3 and 6, a paring control result may be transmitted from the smartphone 3 to the vehicle control apparatus 1. In this case, for example, a UHF transmitter may be provided to the smartphone 3, and a pairing control result may be transmitted from the UHF transmitter.

Although in the above-described embodiments, the vehicle control apparatus 1 determines, at step S101 of FIGS. 3, 6, and 8, whether the get-in condition or get-out condition has been met, and when the vehicle control apparatus 1 detects that either condition has been met, the vehicle control apparatus 1 transmits an LF signal for checking the location of the electronic key 2, the disclosure is not limited thereto. For example, when it is detected that a specific operation by the user is performed on the electronic key 2 or the smartphone 3, the vehicle control apparatus 1 may determine that a predetermined condition has been met, and thus transmit an LF signal.

Although in the above-described embodiments, the vehicle control apparatus 1 determines a location of the electronic key 2 at step S104 of FIGS. 3, 6, and 8, as another method, at step S202, the electronic key 2 may determine itself its location based on a signal strength. In this case, the electronic key 2 transmits location information instead of a signal strength, included in a response signal, and the vehicle control apparatus 1 determines a location of the electronic key 2 based on the received response signal.

Although the above-described embodiments show the customization setting of in-vehicle apparatuses as an example of how to use the electronic key 2 and the smartphone 3, the disclosure is not limited thereto. For example, the disclosure can also be applied to an emergency call via a smartphone, such as that shown in JP 2013-131135 A.

Although the above-described embodiments show a smartphone as an example of a portable device, instead of a smartphone, for example, any other mobile phone or portable tablet may be used as a portable device.

While the invention has been described with reference to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A vehicle control system comprising:
a vehicle control apparatus mounted on a vehicle and configured to control the vehicle;
an electronic key carried by a user and configured to perform communication with the vehicle control apparatus; and
a portable device carried by the user and configured to perform communication with the electronic key,
wherein the vehicle control apparatus:
determines a location of the electronic key based on communication with the electronic key, when the vehicle control apparatus detects that a predetermined condition is met in the vehicle, the electronic key, or the portable device;
controls connection or disconnection of communication between the electronic key and the portable device according to the determined location;
determines whether the vehicle control apparatus succeeds or fails to bring the communication between the electronic key and the portable device into a connected state, based on a notification from the electronic key or the portable device; and
outputs an alert signal when the vehicle control apparatus fails.

2. The vehicle control system according to claim 1, wherein the vehicle control apparatus:
brings the communication between the electronic key and the portable device into a connected state when the vehicle control apparatus determines that the location of the electronic key is in the vehicle; and
brings the communication between the electronic key and the portable device into a disconnected state when the vehicle control apparatus determines that the location of the electronic key is outside the vehicle.

3. The vehicle control system according to claim 1, wherein the vehicle control apparatus:
further determines, when the vehicle control apparatus determines that the location of the electronic key is in the vehicle, whether the user has an intention of getting out of the vehicle, based on a fact that a predetermined operation is performed on the electronic key or the vehicle;
brings the communication between the electronic key and the portable device into a connected state when the user has no intention of getting out of the vehicle, and brings the communication between the electronic key and the portable device into a disconnected state when the user has an intention of getting out of the vehicle,
wherein it is determined that the user has no intention of getting out of the vehicle when the predetermined condition includes at least one selected from the group consisting of: an engine of the vehicle has started, a shifter of the vehicle has been shifted to a position other than park, and a driver side door of the vehicle is locked with the user being in the vehicle, and
wherein it is determined that the user has the intention of getting out of the vehicle when the predetermined condition includes at least one selected from the group consisting of: the engine of the vehicle has stopped, the shifter of the vehicle has been shifted to the park position, or the driver side door to the vehicle is unlocked with the user being in the vehicle;
further determines, when the vehicle control apparatus determines that the location of the electronic key is outside the vehicle, whether the user has an intention of getting in the vehicle, based on a fact that a predetermined operation is performed on the electronic key or the vehicle; and
brings the communication between the electronic key and the portable device into a connected state when the user has an intention of getting in the vehicle, and brings the communication between the electronic key and the portable device into a disconnected state when the user has no intention of getting in the vehicle,
wherein it is determined that the user has the intention of getting in the vehicle when the predetermined condition includes the driver side door being unlocked with the user and the electronic key being outside the vehicle, and
wherein it is determined that the user has no intention of getting in the vehicle when the predetermined condition includes the driver side door being locked with the user being outside the vehicle.

4. A vehicle control system comprising:
a vehicle control apparatus mounted on a vehicle and configured to control the vehicle;
an electronic key carried by a user and configured to perform communication with the vehicle control apparatus; and
a portable device carried by the user and configured to perform communication with the electronic key,
wherein the vehicle control apparatus:
determines a location of the electronic key based on communication with the electronic key, when the vehicle control apparatus detects that a predetermined condition is met in the vehicle, the electronic key, or the portable device;
controls connection or disconnection of communication between the portable device and the vehicle control apparatus according to the determined location;
determines whether the vehicle control apparatus succeeds or fails to bring the communication between the electronic key and the portable device into a connected state, based on a notification from the electronic key or the portable device; and
outputs an alert signal when the vehicle control apparatus fails.

5. The vehicle control system according to claim 4, wherein the vehicle control apparatus:
brings the communication between the portable device and the vehicle control apparatus into a connected state when the vehicle control apparatus determines that the location of the electronic key is in the vehicle; and brings the communication between the portable device and the vehicle control apparatus into a disconnected state when the vehicle control apparatus determines that the location of the electronic key is outside the vehicle.

6. The vehicle control system according to claim 4, wherein the vehicle control apparatus:
further determines, when the vehicle control apparatus determines that the location of the electronic key is in the vehicle, whether the user has an intention of getting out of the vehicle, based on a fact that a predetermined operation is performed on the electronic key or the vehicle;
brings the communication between the portable device and the vehicle control apparatus into a connected state when the user has no intention of getting out of the vehicle, and brings the communication between the portable device and the vehicle control apparatus into a disconnected state when the user has an intention of getting out of the vehicle,
wherein it is determined that the user has no intention of getting out of the vehicle when the predetermined condition includes at least one selected from the group consisting of: an engine of the vehicle has started, a shifter of the vehicle has been shifted to a position other than park, and a driver side door of the vehicle is locked with the user being in the vehicle, and
wherein it is determined that the user has the intention of getting out of the vehicle when the predetermined condition includes at least one selected from the group consisting of: the engine of the vehicle has stopped, the shifter of the vehicle has been shifted to the park position, or the driver side door to the vehicle is unlocked with the user being in the vehicle;
further determines, when the vehicle control apparatus determines that the location of the electronic key is outside the vehicle, whether the user has an intention of getting in the vehicle, based on a fact that a predetermined operation is performed on the electronic key or the vehicle; and
brings the communication between the portable device and the vehicle control apparatus into a connected state when the user has an intention of getting in the vehicle, and brings the communication between the portable device and the vehicle control apparatus into a disconnected state when the user has no intention of getting in the vehicle,
wherein it is determined that the user has the intention of getting in the vehicle when the predetermined condition includes the driver side door being unlocked with the user and the electronic key being outside the vehicle, and
wherein it is determined that the user has no intention of getting in the vehicle when the predetermined condition includes the driver side door being locked with the user being outside the vehicle.

7. The vehicle control system according to claim 4, wherein the vehicle control apparatus outputs an alert signal when the vehicle control apparatus fails to bring the communication between the portable device and the vehicle control apparatus into a connected state.

8. The vehicle control system according to claim 1, wherein the predetermined condition for the vehicle includes a first condition regarding user's getting in the vehicle; and a second condition regarding user's getting out of the vehicle,
wherein the first condition includes at least one of following: a door of the vehicle is unlocked, an engine of the vehicle is started, and a shifter of the vehicle is moved from a park position,
wherein the second condition includes at least one of following: the shifter of the vehicle is in the park position, the engine of the vehicle is stopped, and the door of the vehicle is locked, and
wherein the vehicle control apparatus determines a location of the electronic key when the vehicle control apparatus detects that either one of the first and second conditions is met.

9. The vehicle control system according to claim 1, wherein the predetermined condition for the electronic key is that a specific operation is performed on the electronic key, and
wherein the predetermined condition for the portable device is that a specific operation is performed on the portable device.

* * * * *